(12) United States Patent
Bang et al.

(10) Patent No.: US 12,112,769 B2
(45) Date of Patent: Oct. 8, 2024

(54) SYSTEM, USER TERMINAL, AND METHOD FOR PROVIDING AUTOMATIC INTERPRETATION SERVICE BASED ON SPEAKER SEPARATION

(71) Applicant: Electronics and Telecommunications Research Institute, Daejeon (KR)

(72) Inventors: Jeong Uk Bang, Daejeon (KR); Seung Yun, Daejeon (KR); Sang Hun Kim, Daejeon (KR); Min Kyu Lee, Daejeon (KR); Joon Gyu Maeng, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 427 days.

(21) Appl. No.: 17/531,316

(22) Filed: Nov. 19, 2021

(65) Prior Publication Data

US 2022/0215857 A1    Jul. 7, 2022

(30) Foreign Application Priority Data

Jan. 5, 2021   (KR) .................. 10-2021-0000912
Aug. 11, 2021  (KR) .................. 10-2021-0106300

(51) Int. Cl.
| | |
|---|---|
| *G10L 25/84* | (2013.01) |
| *G06F 40/40* | (2020.01) |
| *G06F 40/58* | (2020.01) |
| *G10L 13/00* | (2006.01) |
| *G10L 15/02* | (2006.01) |

(Continued)

(52) U.S. Cl.
CPC .............. *G10L 25/84* (2013.01); *G06F 40/40* (2020.01); *G06F 40/58* (2020.01); *G10L 13/00* (2013.01); *G10L 15/02* (2013.01); *G10L 15/08* (2013.01); *G10L 15/26* (2013.01); *G10L 21/0208* (2013.01)

(58) Field of Classification Search
CPC ..... G10L 15/26; G10L 13/00; G10L 21/0208; G06F 40/58; G06F 40/40
See application file for complete search history.

(56) References Cited

U.S. PATENT DOCUMENTS 9,864,745 B2   1/2018  Dalce
10,489,515 B2  11/2019  Choi et al.
(Continued)

FOREIGN PATENT DOCUMENTS

CN       109360549 A     2/2019
JP       2012059121 A    3/2012
(Continued)

*Primary Examiner* — Samuel G Neway
(74) *Attorney, Agent, or Firm* — William Park & Associates Ltd.

(57) ABSTRACT

Provided is a method of performing automatic interpretation based on speaker separation by a user terminal, the method including: receiving a first speech signal including at least one of a user speech of a user and a user surrounding speech around the user from an automatic interpretation service providing terminal, separating the first speech signal into speaker-specific speech signals, performing interpretation on the speaker-specific speech signals in a language selected by the user on the basis of an interpretation mode, and providing a second speech signal generated as a result of the interpretation to at least one of a counterpart terminal and the automatic interpretation service providing terminal according to the interpretation mode.

12 Claims, 11 Drawing Sheets

(51) Int. Cl.
*G10L 15/08* (2006.01)
*G10L 15/26* (2006.01)
*G10L 21/0208* (2013.01)

(56) References Cited

U.S. PATENT DOCUMENTS

| | | | |
|---|---|---|---|
| 10,588,763 B2 | 3/2020 | Kassab et al. | |
| 2008/0077387 A1* | 3/2008 | Ariu | G10L 15/22 |
| | | | 704/E15.04 |
| 2008/0120091 A1* | 5/2008 | Waibel | G06F 40/58 |
| | | | 704/E15.02 |
| 2009/0274299 A1* | 11/2009 | Caskey | H04L 63/104 |
| | | | 380/255 |
| 2010/0299150 A1* | 11/2010 | Fein | G06F 40/58 |
| | | | 704/277 |
| 2011/0238405 A1* | 9/2011 | Pedre | G10L 15/26 |
| | | | 704/E11.001 |
| 2011/0301936 A1* | 12/2011 | Yun | G10L 15/26 |
| | | | 704/2 |
| 2014/0242955 A1* | 8/2014 | Kang | G06F 40/58 |
| | | | 455/414.1 |
| 2014/0337007 A1* | 11/2014 | Waibel | G06F 40/58 |
| | | | 704/2 |
| 2019/0354592 A1* | 11/2019 | Musham | G10L 13/00 |
| 2020/0159822 A1 | 5/2020 | Roh et al. | |
| 2021/0090548 A1* | 3/2021 | Debner | G10L 13/086 |
| 2021/0249033 A1* | 8/2021 | Hsu | G10L 21/0208 |
| 2022/0215857 A1* | 7/2022 | Bang | G10L 15/02 |

FOREIGN PATENT DOCUMENTS

| | | |
|---|---|---|
| KR | 101412657 B1 | 6/2014 |
| KR | 1020160080337 A | 7/2016 |
| KR | 1020190015081 A | 2/2019 |
| KR | 1020190029237 A | 3/2019 |
| KR | 1020190074012 A | 6/2019 |
| KR | 1020190103081 A | 9/2019 |
| KR | 1020200125735 A | 11/2020 |
| WO | 2018186416 A1 | 10/2018 |

* cited by examiner

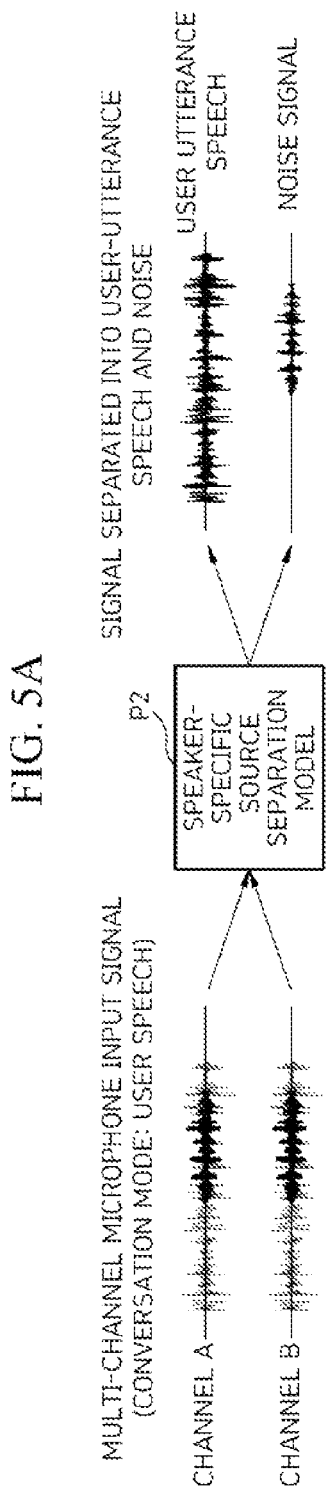

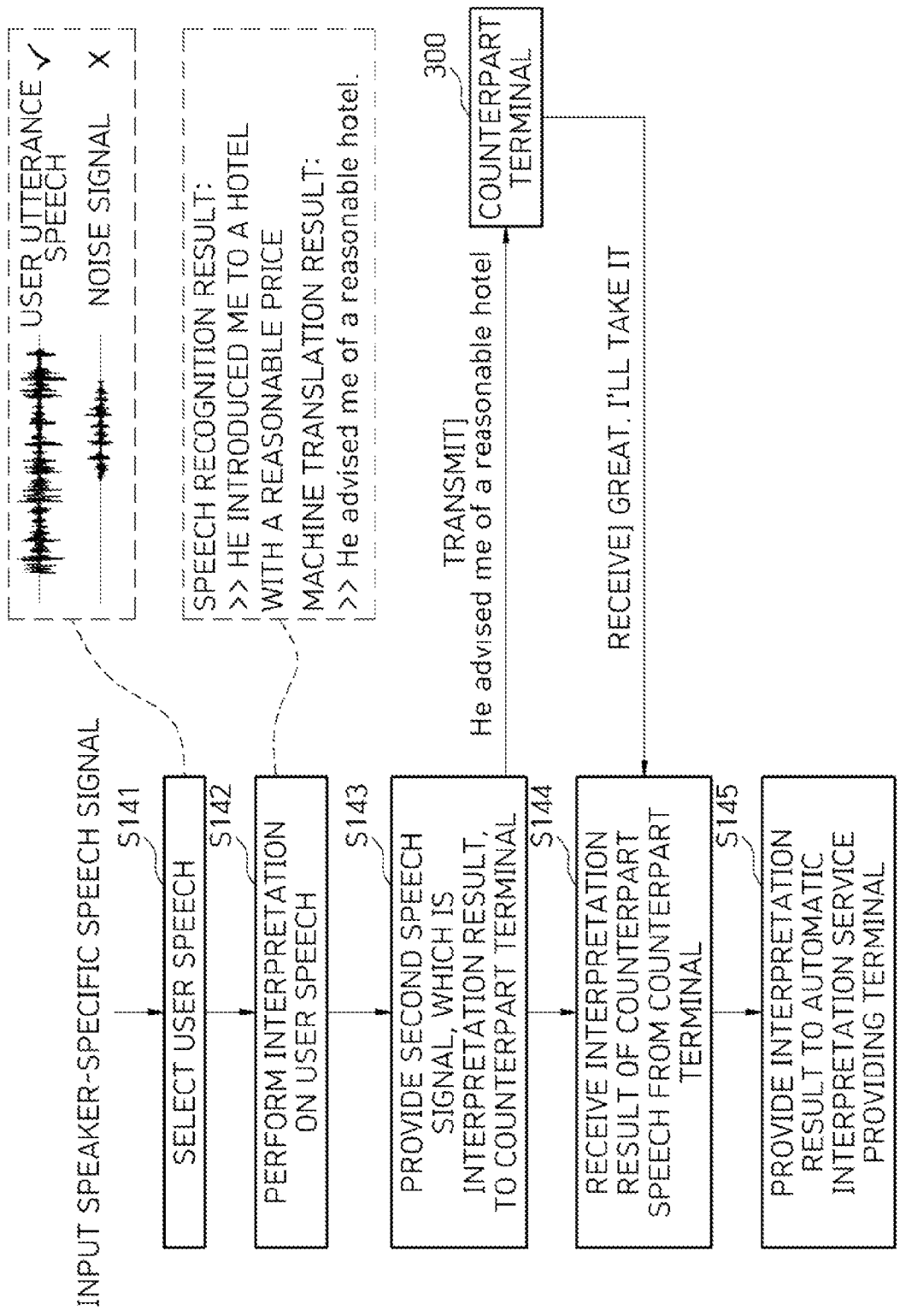

SYSTEM, USER TERMINAL, AND METHOD FOR PROVIDING AUTOMATIC INTERPRETATION SERVICE BASED ON SPEAKER SEPARATION

CROSS-REFERENCE TO RELATED APPLICATION

This application claims priority to and the benefit of Korean Patent Applications No. 10-2021-0000912, filed on Jan. 5, 2021, and No. 10-2021-0106300, filed on Aug. 11, 2021, the disclosures of which are incorporated herein by reference in its entirety.

BACKGROUND

1. Field of the Invention

The present invention relates to a system, a user terminal, and a method for providing an automatic interpretation service based on speaker separation.

2. Discussion of Related Art

In general, automatic interpretation (or automatic translation) uses a structure in which a first language of a user is recognized, interpreted into a second language, and then transmitted to a counterpart terminal, or an interpretation result received from the counterpart terminal is synthesized and output to the user.

Such an approach basically aims for a face-to-face conversation in which a user and a counterpart are present. However, most situations that require automatic interpretation are the case when a user visits a foreign country, and has a conversation with a native (sightseeing, restaurants, shopping, hotels, business, etc.) or understands speech of foreigners heard around the user, such as airport information speeches, television (TV) news of travel regions, speeches of nearby foreigners, to determine the situation.

That is, a need for interpreting not only face-to-face conversations but also speeches of foreigners heard around a user and providing the interpretation result to the user arises, but there is a lack of such technology.

RELATED ART DOCUMENTS

Patent Document

Korean Laid-open Patent Publication No. 10-2019-0015081 (Feb. 13, 2019)

SUMMARY OF THE INVENTION

The present invention is directed to providing a system, a user terminal, and a method for providing an automatic interpretation service based on speaker separation, in which speeches of a plurality of speakers input to an individual device are divided for each speaker and are all converted into speeches of a language desired by a user to provide an interpretation result.

The technical objectives of the present invention are not limited to the above, and other objectives may become apparent to those of ordinary skill in the art based on the following description.

According to the first aspect of the present invention, there is provided a method of performing automatic interpretation based on speaker separation by a user terminal, the method including: receiving a first speech signal including at least one of a user speech of a user and a user surrounding speech around the user from an automatic interpretation service providing terminal, separating the first speech signal into speaker-specific speech signals, performing interpretation on the speaker-specific speech signals in a language selected by the user on the basis of an interpretation mode, and providing a second speech signal generated as a result of the interpretation to at least one of a counterpart terminal and the automatic interpretation service providing terminal according to the interpretation mode.

The receiving of the first speech signal including the at least one of the user speech of the user and the user surrounding speech may include receiving the first speech signal on the basis of the interpretation mode from the automatic interpretation service providing terminal, wherein the automatic interpretation service providing terminal may receive the user speech through a microphone when the interpretation mode is a conversation mode and receive the user surrounding speech through the microphone when the interpretation mode is a listening mode.

The performing of interpretation on the speaker-specific speech signals in the language selected by the user on the basis of the interpretation mode may include, when the interpretation mode is a conversation mode, selecting the user speech among the separated speaker-specific speech signals to perform the interpretation, and the providing of the second speech signal generated as the result of the interpretation to the at least one of the counterpart terminal and the automatic interpretation service providing terminal according to the interpretation mode may include providing the counterpart terminal with the second speech signal, which is an interpretation result for the user speech, and providing the automatic interpretation service providing terminal with an interpretation result for a counterpart speech received from the counterpart terminal.

The performing of interpretation on the speaker-specific speech signals in the language selected by the user on the basis of the interpretation mode may include, when the interpretation mode is a listening mode, selecting the user surrounding speech among the separated speaker-specific speech signals to perform the interpretation, and the providing of the second speech signal generated as the result of the interpretation to the at least one of the counterpart terminal and the automatic interpretation service providing terminal according to the interpretation mode may include classifying interpretation results for the user surrounding speech according to each speaker and providing the automatic interpretation service providing terminal with the interpretation results.

The performing of interpretation on the speaker-specific speech signals into the language selected by the user on the basis of the interpretation mode may include: extracting situation information including at least one of speaker information, context information, and noise information from the user surrounding speech, storing the extracted situation information in a buffer; and interpreting the speaker-specific speech signal included in the user surrounding speech on the basis of the extracted situation information.

The providing of the second speech signal generated as the result of the interpretation to the at least one of the counterpart terminal and the automatic interpretation service providing terminal according to the interpretation mode may include classifying speech signals according to each speaker from the extracted situation information and providing the automatic interpretation service providing terminal with an interpretation result in which intensity information and echo information of the speech signal classified according to each speaker are reflected.

The providing of the second speech signal generated as the result of the interpretation to the at least one of the counterpart terminal and the automatic interpretation service providing terminal according to the interpretation mode may include providing the automatic interpretation service providing terminal with an interpretation result corresponding to at least one speaker selected by the user among the interpretation results for the user surrounding speech.

According to the second aspect of the present invention, there is provided a user terminal for providing an automatic interpretation service based on speaker separation, the user terminal including: a communication module configured to transmit and receive data to and from an automatic interpretation service providing terminal and a counterpart terminal; a memory in which a program for receiving a first speech signal including at least one of a user speech of a user and a user surrounding speech around the user from the automatic interpretation service providing terminal and, based on the received first speech signal, generating a second speech signal that is an interpretation result is stored; and a processor configured to execute the program stored in the memory, wherein the processor executes the program to: separate the first speech signal into speaker-specific speech signals; perform interpretation on the speaker-specific speech signals in a language selected by the user on the basis of an interpretation mode; and provide a second speech signal generated as a result of the interpretation to at least one of a counterpart terminal and the automatic interpretation service providing terminal through the communication module according to the interpretation mode.

The automatic interpretation service providing terminal may receive the user speech through a microphone when the interpretation mode is a conversation mode and may receive the user surrounding speech through the microphone when the interpretation mode is a listening mode.

The processor, when the interpretation mode is a conversation mode, may select the user speech among the separated speaker-specific speech signals to perform the interpretation, may provide the counterpart terminal with the second speech signal, which is an interpretation result for the user speech, through the communication module, and may provide the automatic interpretation service providing terminal with an interpretation result for a counterpart speech received from the counterpart terminal.

The processor, when the interpretation mode is a listening mode, may select the user surrounding speech among the separated speaker-specific speech signals to perform the interpretation, may classify interpretation results for the user surrounding speech according to each speaker, and may provide the automatic interpretation service providing terminal with the interpretation results through the communication module.

The processor may extract situation information including at least one of speaker information, context information, and noise information from the user surrounding speech, store the extracted situation information in a buffer, and interpret the speaker-specific speech signal included in the user surrounding speech on the basis of the extracted situation information.

The processor may be configured to, based on the first and second speech signals and the extracted situation information, automatically update performances of a speaker-specific source separation model for separating the first speech signal into the speaker-specific speech signals, a speech recognition model for recognizing the first speech signal, a machine translation model for translating the first speech signal, and an automatic interpretation model having a combination thereof.

The processor may classify speech signals according to each speaker from the extracted situation information and provide the automatic interpretation service providing terminal with an interpretation result, in which intensity information and echo information of the speech signal classified according to each speaker are reflected, through the communication module.

The processor may provide the automatic interpretation service providing terminal with an interpretation result corresponding to at least one speaker selected by the user among the interpretation results for the user surrounding speech.

According to the third aspect of the present invention, there is provided a system for providing an automatic interpretation service based on speaker separation, the system including: an automatic interpretation service providing terminal configured to receive a first speech signal including at least one of a user speech of a user and a user surrounding speech around the user through a multichannel microphone and provide an interpretation result for the speech signal and an interpretation result for a counterpart speech through a speaker; a user terminal configured to receive the first speech signal, separate the received first speech signal into speaker-specific signals, perform interpretation on the speaker-specific speech signals in a language selected by the user on the basis of an interpretation mode, and provide a second speech signal generated as a result of the interpretation to at least one of a counterpart terminal and the automatic interpretation service providing terminal according to the interpretation mode; and the counter terminal configured to receive the second speech signal from the user terminal and provide the received second speech signal, interpret the counter speech and provide the interpreted counterpart speech according to the interpretation mode.

According to another aspect of the present invention, there is provided a computer program that executes a system, a user terminal and a method for providing an automatic interpretation service based on speaker separation in combination with a computer, which is hardware, and is stored in a computer readable recording medium.

Other specific details of the present invention are included in the specification and the accompanying drawings.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which:

FIGS. 5A and 5B are diagrams for describing an example of separating a first speech signal into speaker-specific speech signals:

FIG. 6 is a diagram for describing a conversation mode provided in an embodiment of the present invention:

DETAILED DESCRIPTION OF EXEMPLARY EMBODIMENTS

Figure 1:
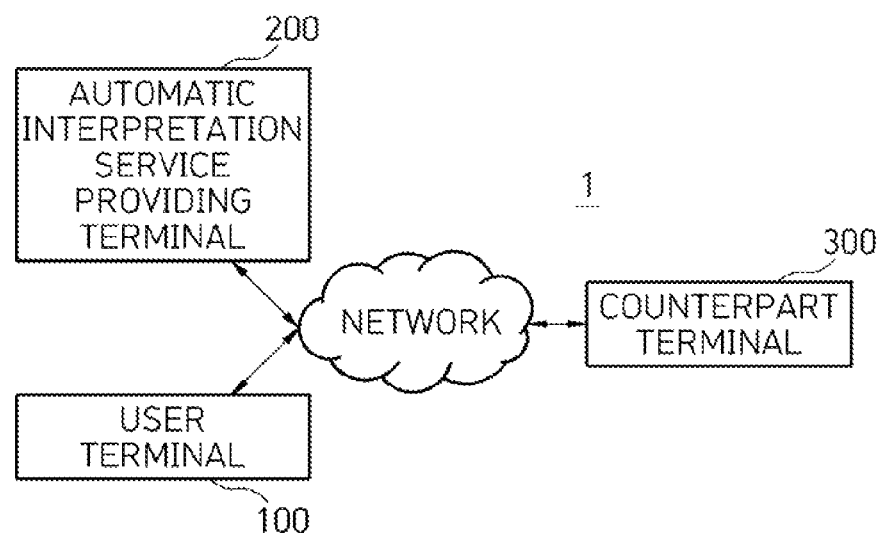
FIG. 1 is a schematic diagram illustrating a system for providing an automatic interpretation service based on speaker separation according to an embodiment of the present invention.

Hereinafter, the advantages and features of the present invention and ways of achieving them will become readily apparent with reference to descriptions of the following detailed embodiments in conjunction with the accompanying drawings. However, the present invention is not limited to such embodiments and may be embodied in various forms. The embodiments to be described below are provided only to complete the disclosure of the present invention and assist those of ordinary skill in the art in fully understanding the scope of the present invention, and the scope of the present invention is defined only by the appended claims.

Terms used herein are used for aiding in the description and understanding of the embodiments and are not intended to limit the scope and spirit of the present invention. It should be understood that the singular forms "a" and "an" also include the plural forms unless the context clearly dictates otherwise. The terms "comprises," "comprising," "includes," and/or "including," when used herein, specify the presence of stated features, integers, steps, operations, elements, components and/or groups thereof and do not preclude the presence or addition of one or more other features, integers, steps, operations, elements, components, and/or groups thereof. In connection with assigning reference numerals to elements in the drawings, the same reference numerals are used for designating the same elements throughout the specification, and the term "and/or" includes any one or combinations of the associated listed items. It should be understood that, although the terms "first," "second," etc. may be used herein to describe various elements, these elements are not limited by these terms. These terms are only used for distinguishing one element from another. For example, a first element could be termed a second element without departing from the scope of the present invention.

Unless otherwise defined, all terms (including technical and scientific terms) used herein have the same meaning as commonly understood by one of ordinary skill in the art to which this invention belongs. It should be further understood that terms, such as those defined in commonly used dictionaries, should not be interpreted in an idealized or overly formal sense unless expressly so defined herein.

The present invention relates to a system 1, a user terminal 10, and a method for providing an automatic interpretation service based on speaker separation.

Unlike the conventional method aimed for a face-to-face conversation in an automatic interpretation, the present invention is characterized by classifying a mixture of speeches of a plurality of speakers input to an individual device, converting all of the classified speeches into speeches of a language desired by the user, and providing the converted speeches of the plurality of speakers to the user terminal 100 in consideration of the characteristics of each speaker. Here, the language desired by the user may generally be the native language of the user but is not limited thereto.

With such a configuration, an embodiment of the present invention may aid a user in easily understanding the surrounding situation when exposed to a heterogeneous language environment (e.g., overseas travel, etc.), such as visiting a foreign country, and may provide an improved automatic interpretation performance and improved user convenience by using user surrounding information for a face-to-face automatic interpretation system.

In addition, an embodiment of the present invention may be used in a native language environment, for example, by receiving a result of interpreting a user surrounding speech received in a native language environment and interpreted in English and using the received result foreign language learning. In particular, the present invention is characterized by, with regard to providing the interpretation result for the user surrounding speech, additionally extracting situation information and reflecting the situation information in a synthesized speech signal, thereby providing not only the interpretation result for each of the speeches of the plurality of speakers included in the user surrounding speech but also providing location information in the interpretation result, and thus achieving more live foreign language learning.

Meanwhile, an embodiment of the present invention is directed to a simultaneous interpretation in an environment in which a speaker and a listener use different languages but is not limited thereto.

Hereinafter, the system 1, the user terminal 100, and the method for providing an automatic interpretation service based on speaker separation will be described with reference to FIGS. 1 and 2.

FIG. 1 is a schematic diagram illustrating the system 1 for providing an automatic interpretation service based on speaker separation according to an embodiment of the present invention. FIG. 2 is a block diagram illustrating the user terminal 100 according to an embodiment of the present invention.

The system 1 for providing an automatic interpretation service based on speaker separation according to the embodiment of the present invention includes a user terminal 100, an automatic interpretation service providing terminal 200, and a counterpart terminal 300.

First, the automatic interpretation service providing terminal 200 receives a first speech signal including at least one of a user speech and a user surrounding speech through a multi-channel microphone 210. In addition, the automatic interpretation service providing terminal 200 receives an interpretation result for the first speech signal from the user terminal 100 or receives an interpretation result for a counterpart speech from the counterpart terminal 300 and provides the received interpretation result through a speaker 230.

In this case, the automatic interpretation service providing terminal 200 may be provided with an interpretation mode selecting button 220 and receive a speech and provide an interpretation result according to the interpretation mode selected by the user.

In an embodiment, the automatic interpretation service providing terminal 200 may be provided in the form of a hands-free terminal having the speaker 230 and the microphone 210, but the present invention is not limited thereto, and the automatic interpretation service providing terminal 200 may be provided in any type of terminal including a speaker 230 and a microphone 210. Accordingly, the automatic interpretation service providing terminal 200 may be integrally provided with a user terminal 100 having a microphone 210 and a speaker 230 or a counterpart terminal 300 having a microphone 210 and a speaker 230.

Figure 2:
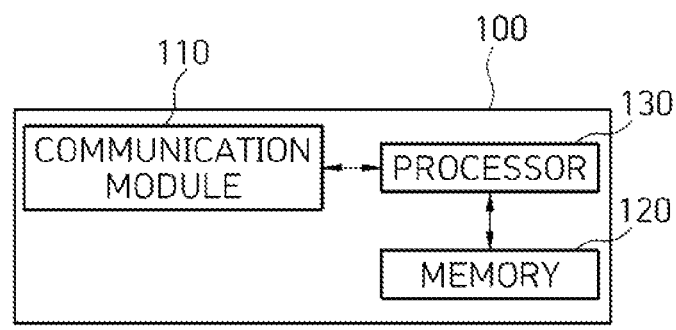
FIG. 2 is a block diagram illustrating a user terminal according to an embodiment of the present invention.

Referring to FIG. 2, the user terminal 100 includes a communication module 110, a memory 120, and a processor 130.

The communication module 110 transmits and receives data to and from the automatic interpretation service providing terminal 200 and the counterpart terminal 300. That is, the communication module 110 may provide an interpretation result of a user speech to the counterpart terminal 300 in real time and may receive an interpretation result of a counterpart speech received from the counterpart terminal 300 and provide the interpretation result of the counterpart speech to the automatic interpretation service providing terminal 200.

In this case, the communication module may include a wireless communication module but does not exclude a wired communication module. The wired communication module may be implemented as a power line communication device, a telephone line communication device, a control device supporting cable home (multimedia over coaxial alliance (MoCA)), Ethernet, IEEE1294, an integration wired home network, RS-485, and/or the like. Also, the wireless communication module may be implemented using a wireless local area network (WLAN), Bluetooth, a high-data-rate wireless personal area network (HDR WPAN), ultra-wideband (UWB), ZigBee, impulse radio, 60 GHz WPAN, binary-CDMA, wireless Universal Serial Bus (USB) technology, wireless high-definition multimedia interface (HDMI) technology, and/or the like.

The memory 120 stores a program configured to, based on receiving a first speech signal including at least one of a user speech and a user surrounding speech from the automatic interpretation service providing terminal 200, generate a second speech signal that is an interpretation result.

Here, the memory 120 collectively refers to a nonvolatile storage device, which keeps stored information even when power is not supplied, and a volatile storage device. For example, the memory may include a NAND flash memory such as a compact flash (CF) card, a secure digital (SD) card, a memory stick, a solid-state drive (SSD), and a micro-SD card, a magnetic computer storage device such as a hard disk drive (HDD), and an optical disc drive such as a compact disc-read only memory (CD-ROM) and a digital versatile disc (DVD)-ROM.

The processor 130 executes the program stored in the memory 120 to separate the first speech signal received from the automatic interpretation service providing terminal 200 into speaker-specific speech signals, interpret the speaker-specific speech signals into a language selected by the user on the basis of an interpretation mode, and provide a second speech signal generated as a result of the interpretation to at least one of the counterpart terminal 300 and the automatic interpretation service providing terminal 200 though the communication module 110 according to the interpretation mode.

The counterpart terminal 300, similar to the user terminal 100, receives a speech signal and provides an interpretation result to the user terminal 100 or the automatic interpretation service providing terminal 200 pairing with the counterpart terminal 300. That is, in the embodiment of the present invention, the user terminal 100 and the counterpart terminal 300 are assigned different names according to subjects who use the user terminal 100 and the counterpart terminal 300 and may have the same configuration and function.

On the other hand, the user terminal 100 and the counterpart terminal 300 in the present invention may be implemented as a server system; a laptop, a desktop computer, etc. equipped with a web browser; an intelligent device that combines a portable device with a computer support function, such as Internet communication and information retrieval; or a mobile phone, a smart phone, a pad, a smart watch, a wearable device, and other mobile communication devices in which a number of application programs (i.e., applications) desired by a user are installed and executed.

Hereinafter, a method of providing an automatic interpretation based on speaker separation in a user terminal 100 according to an embodiment of the present invention will be described with reference to FIGS. 3 to 11 in more detail.

Figure 3:
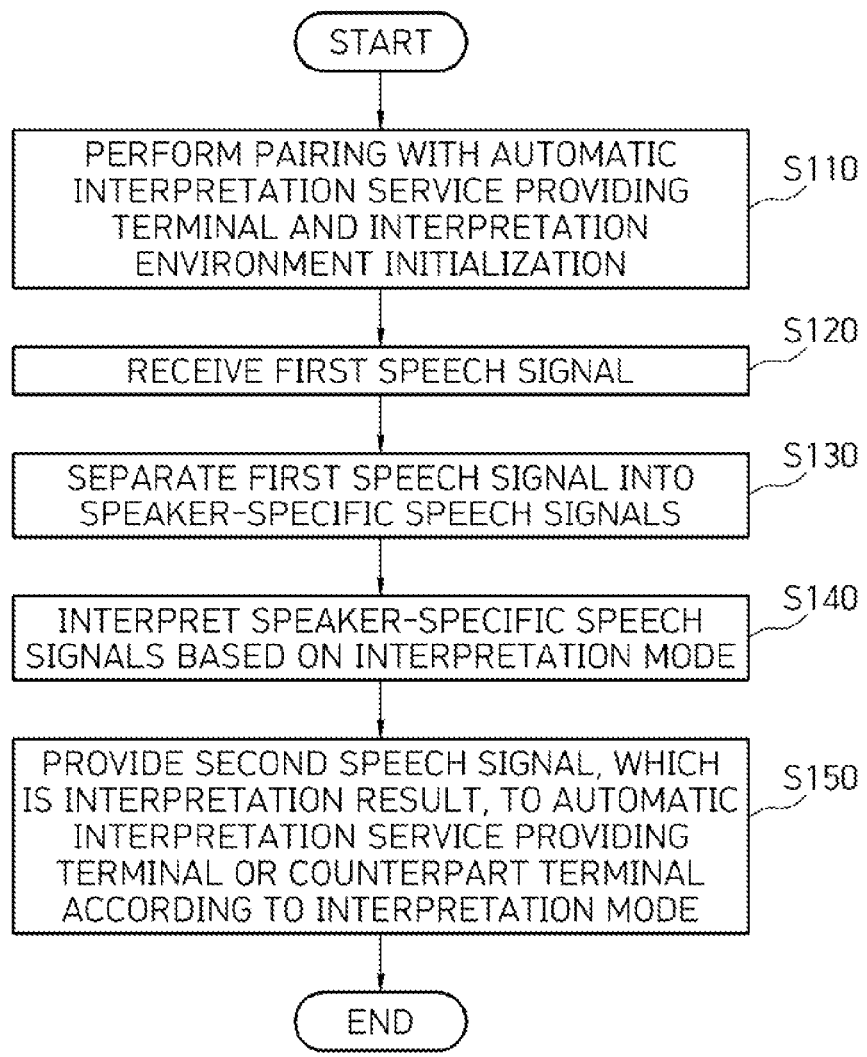
FIG. 3 is a flowchart showing a method of providing an automatic interpretation service based on speaker separation according to an embodiment of the present invention.
Figure 4:
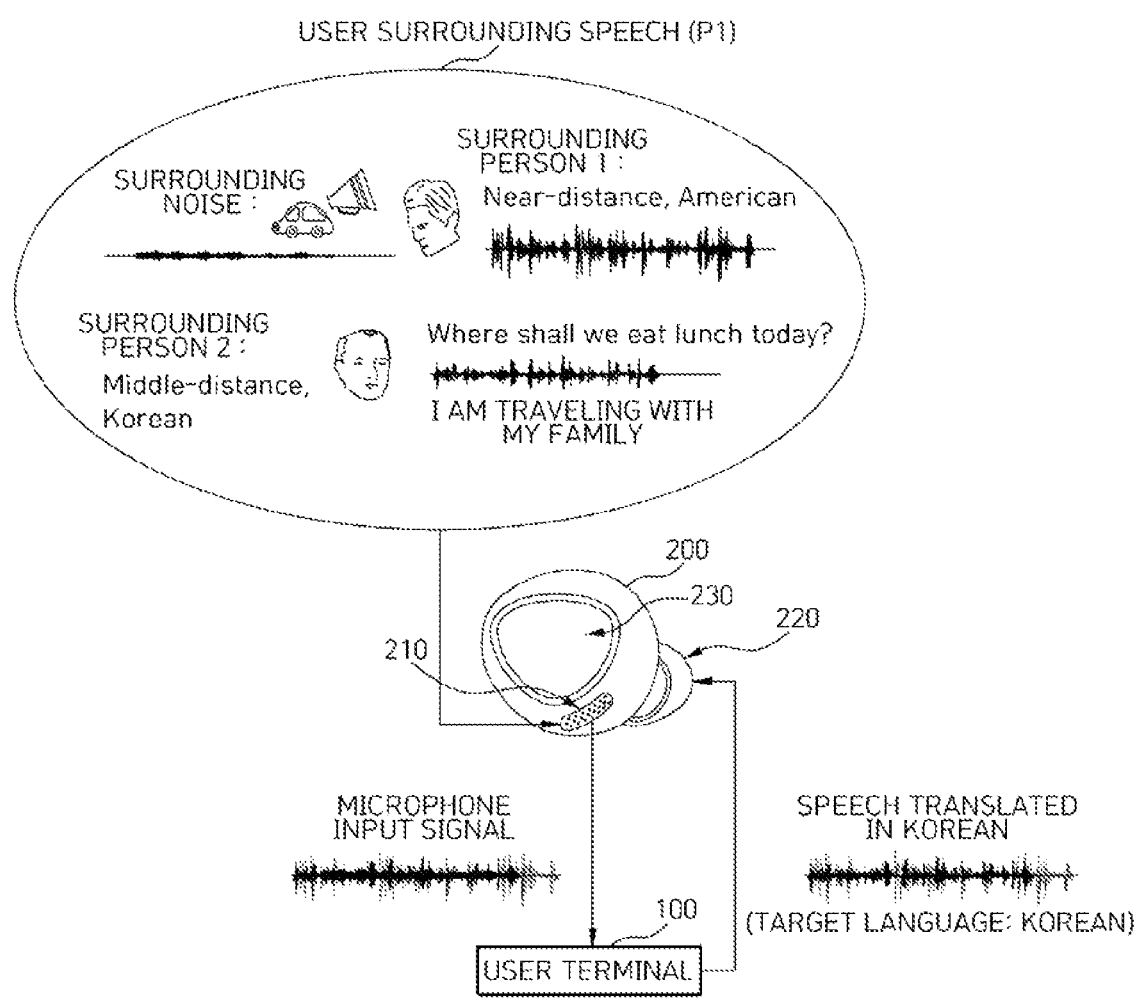
FIG. 4 is a diagram for describing a surrounding speech around a user.
Figure 5B:
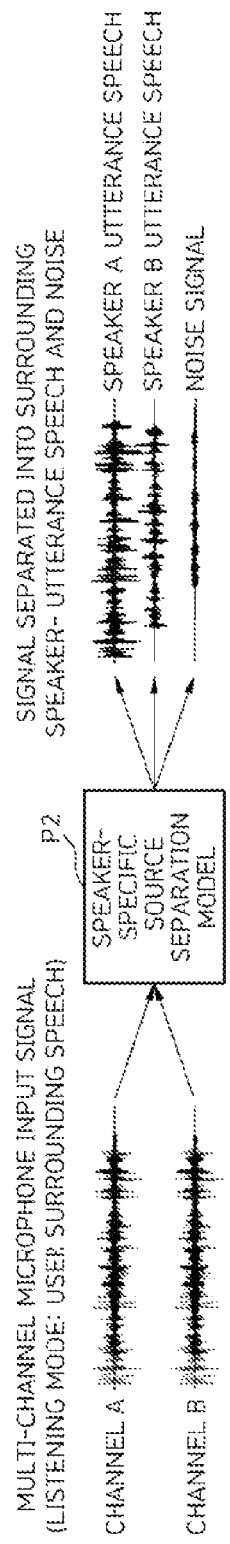

FIG. 3 is a flowchart showing a method of providing an automatic interpretation service based on speaker separation according to an embodiment of the present invention. FIG. 4 is a diagram for describing a surrounding speech around a user. FIGS. 5A and 5B are diagrams for describing an example of separating a first speech signal into speaker-specific speech signals.

First, according to a request of the automatic interpretation service providing terminal 200 or the user terminal 10, the user terminal 100 is pairing with the automatic interpretation service providing terminal 200 (S110). In this case, the user terminal 100 initializes an interpretation environment as pairing with the automatic interpretation service providing terminal 200. An example of the initialization of the interpretation environment may include initializing situation information (speaker information, context information, and noise information) in a previously performed interpretation result. However, considering a case in which the surrounding speech is received in the same environment or a conversation is continued with the same counterpart, the process of initializing the interpretation environment may be selectively performed according to an input of a user.

Next, the user terminal 100 receives a first speech signal including at least one of a user speech and a user surrounding speech from the automatic interpretation service providing terminal 200 (S120).

In this case, the user speech corresponds to an utterance of a user who is the subject using the user terminal 100, and the user surrounding speech corresponds to remaining speeches except for the user speech received through the multi-channel microphone 210. That is, the embodiment of the present invention basically provides a face-to-face interpretation service of performing an interpretation on an utterance that is a user speech, providing the interpretation result to the counterpart terminal 300, receiving an interpretation result for a counterpart speech from the counterpart terminal 300, and providing the received interpretation result to the user terminal 100 and the automatic interpretation service providing terminal 200.

In addition to the face-to-face conversation, the embodiment of the present invention may receive surrounding speeches from various speakers using the multi-channel microphone 210, perform an interpretation on the surrounding speeches, and provide the interpretation result to the user terminal 100 and the automatic interpretation service providing terminal 200. Here, the various speakers may correspond to not only a direct utterance by a person but also but also a guide speech output through the speaker 230 without restriction on the subjects of utterances.

For example, referring to FIG. 4, a user surrounding speech P1 may include "surrounding noise," "a speech of surrounding person 1," and "a speech of surrounding person 2," in which surrounding persons 1 and 2 correspond to unspecified persons who do not communicate directly with the user.

In such a situation, according to the embodiment of the present invention, the automatic interpretation service providing terminal 200, upon a user surrounding speech being received through the multi-channel microphone 210 of the automatic interpretation service providing terminal 200, may provide the user terminal 100 with the received user surrounding speech, and the user terminal 100 may generate interpretation results (Korean) corresponding to speech languages (English and Korean) of surrounding person 1 and surrounding person 2 as will be described below, and provide the interpretation results such that the interpretation results are output through the speaker 230 of the automatic interpretation service providing terminal 200.

In this case, the automatic interpretation service providing terminal 200 may be provided with an interpretation mode selecting button 220 and may receive a speech and provide an interpretation result according to an interpretation mode selected by the user.

Next, the user terminal 100 separates the first speech signal into speaker-specific speech signals (S130).

According to the embodiment of the present invention, a user speech and a user surrounding speech are first separated into speaker-specific speech signals.

As for distinguishing the user speech and the user surrounding speech, the user speech and the user surrounding speech may be easily distinguished according to the interpretation mode as shown in FIGS. 5A and 5B. That is, a speech received through the microphone 210 in the face-to-face conversation mode may be recognized as a user speech and, in the listening mode rather than the conversation mode, may be recognized as a user surrounding speech. The speech may also be provided by being distinguished by the automatic interpretation service providing terminal 200 in advance.

In the process of separating the speaker-specific speech signals, a user speech is separated into a user utterance speech and a noise signal by a speaker-specific source separation model P2 because only one speaker is present. In addition, a user surrounding speech is separated into a plurality of speaker utterance speeches and a noise signal by the speaker-specific source separation model P2.

Referring again to FIG. 3, next, the user terminal 100 interprets the speaker-specific speech signal into a language selected by the user on the basis of the interpretation mode (S140). The user terminal 100 provides a second speech signal generated as a result of the interpretation to at least one of the counterpart terminal 300 and the automatic interpretation service providing terminal 200 according to the interpretation mode (S150).

Figure 7:
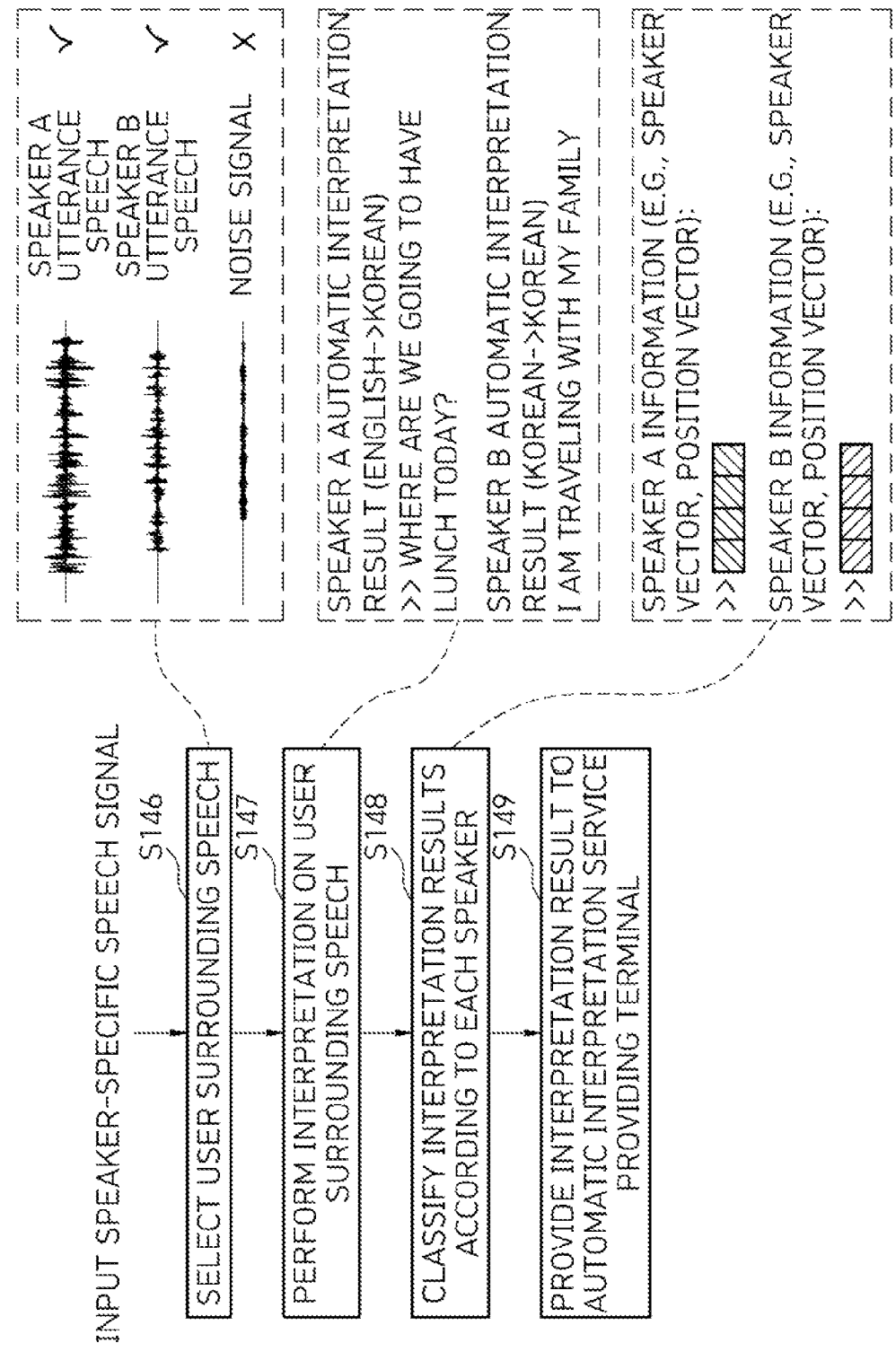
FIG. 7 is a diagram for describing a listening mode provided in an embodiment of the present invention.
Figure 8:
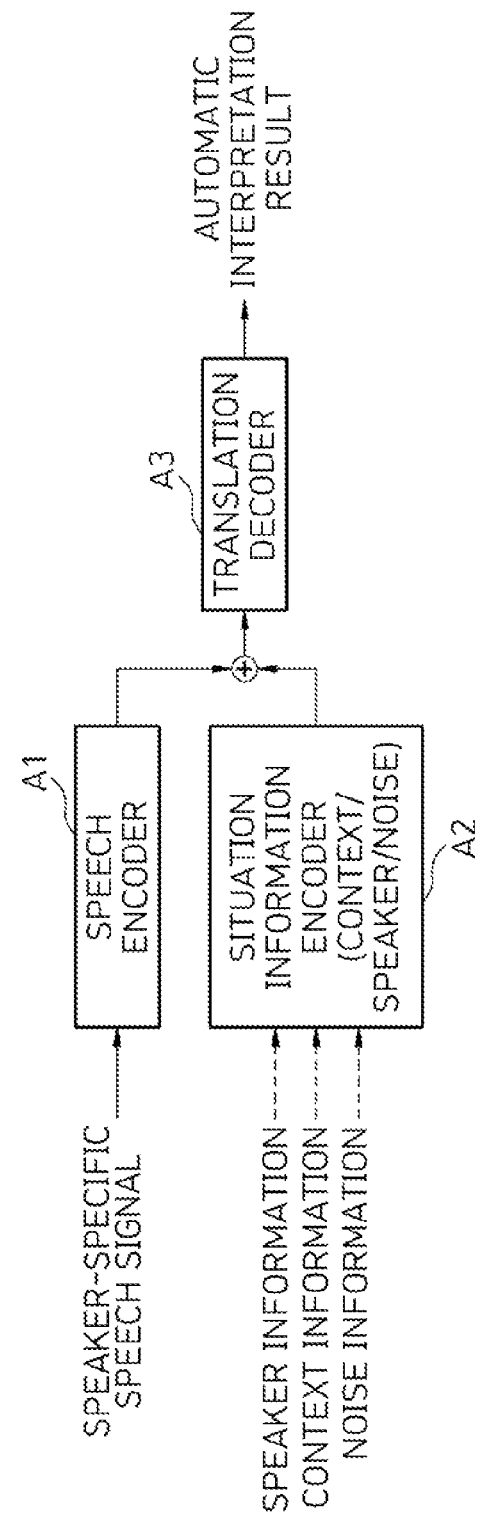
FIGS. 8 and 9 are diagrams for describing an example of extracting and reflecting situation information in an embodiment of the present invention.
Figure 9:
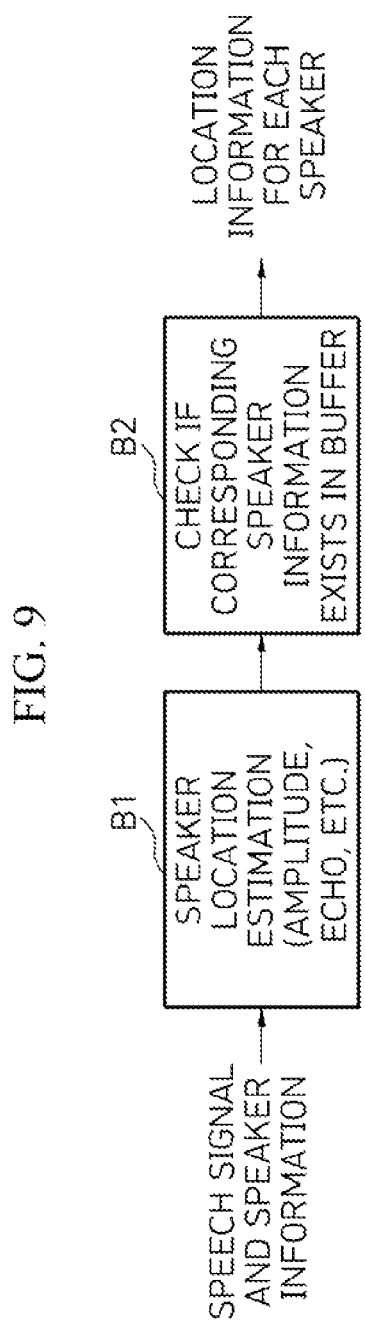
Figure 10:
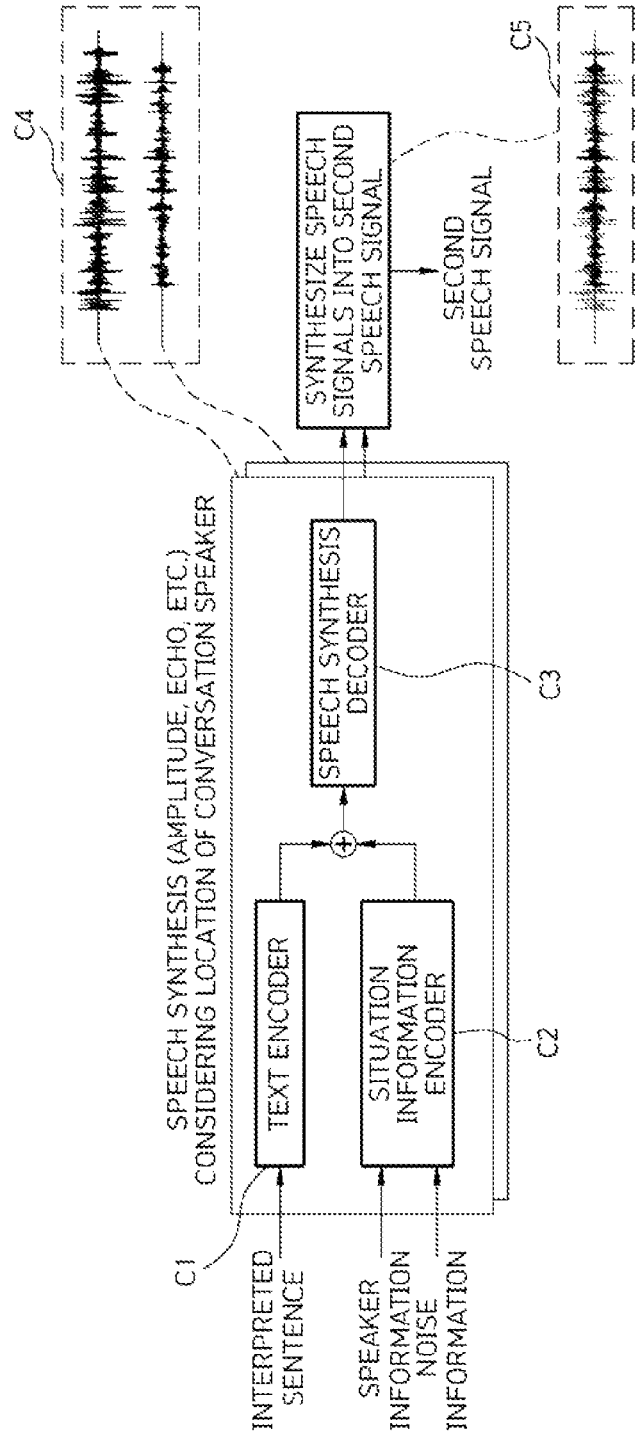
FIG. 10 is an overall diagram illustrating an example of providing a second speech signal based on collected situation information.

FIG. 6 is a diagram for describing a conversation mode provided in an embodiment of the present invention. FIG. 7 is a diagram for describing a listening mode provided in an embodiment of the present invention. FIGS. 8 and 9 are diagrams for describing an example of extracting and reflecting situation information in an embodiment of the present invention. FIG. 10 is an overall diagram illustrating an example of providing a second speech signal based on collected situation information.

As an embodiment, the present invention provides a conversation mode and a listening mode as the interpretation mode.

First, referring to FIG. 6, the conversation mode is a case in which the user and the counterpart have a face-to-face conversation, and the user terminal 100, in the conversation mode, selects a user speech among the separated speaker-specific speech signals (S141), performs an interpretation on the user speech (S142), and provides a second speech signal, which is a result of interpretation of the user speech, to the counterpart terminal 300 (S143). In addition, the user terminal 100, when the counterpart converses, such as replying, receives an interpretation result of the counterpart speech received from the counterpart terminal 300 (S144) and provides the interpretation result to the automatic interpretation service providing terminal 200 (S145).

Next, referring to FIG. 7, the listening mode is a case for receiving and interpreting speeches of a user surrounding situation, rather than a case of a face-to-face conversation, and the user terminal 100 selects a user surrounding speech among the separated speaker-specific speech signals (S146) and performs interpretation on the user surrounding speech (S147). In addition, the user terminal 100 may classify the interpretation results for the user surrounding speech according to each speaker (S148) and provide the interpretation results to the automatic interpretation service providing terminal 200 (S149).

In this case, the user terminal 100, in the listening mode, may further perform a process of extracting situation information from the user surrounding speech. Referring to FIG. 8, the user terminal 100 inputs the speaker-specific speech signals classified from the user surrounding speech to a speech encoder A1, extracts situation information including at least one of speaker information, context information, and noise information from the user surrounding speech separated for each speaker, and stores the extracted situation information in a buffer.

Then, the user terminal 100, after inputting the extracted situation information to a situation information encoder A2, summates output information of the situation information encoder A2 with output information of the speech encoder A1 and inputs the summation to a translation decoder A3, thereby providing an interpretation result that reflects situation information when interpreting the user surrounding speech.

In this case, as shown in FIG. 9, the user terminal 100 may classify speech signals according to each speaker from the extracted situation information and provide the automatic interpretation service providing terminal 200 with an interpretation result, in which intensity information and echo information of the speech signal classified according to each speaker from the situation information is further reflected. That is, the user terminal 100 may estimate location information of a speaker on the basis of intensity information and echo information (B1), check whether information about the corresponding speaker exists in the buffer (B2), and further reflect speaker-specific location information when outputting an automatic interpretation result.

Accordingly, the speaker-specific speech signals output from the automatic interpretation service providing terminal 200 may be output to have characteristics similar to those of the actual speakers.

The existing general automatic interpretation system provides a user with an automatic interpretation result in a voice of a preset single-speaker without considering the characteristics of speakers of the conversation. On the other hand, according to the embodiment of the present invention, automatic interpretation results of multiple speakers may be synthesized to have characteristics similar to voices of the actual speakers through a process of separating speaker-specific speech signals and a process of extracting and applying situation information so that a more natural automatic interpretation result may be provided to the user.

On the other hand, the speaker information may include information for identifying a male/female, a computer voice, the age, the nationality, the emotional state, etc., the context information may be identified through the meaning of preceding and following words or sentences through real-time interpretation results, and the noise information is a concept including information such as a location, a time, a space, and so on.

FIG. 10 is a diagram illustrating an example of providing interpretation results as a second speech signal by reflecting the location information shown in FIG. 9. A speaker-specific speech signal extracted from a user surrounding speech and speaker information and location information extracted from situation information are input to a text encoder C1 and a situation information encoder C2, respectively. Then, output information of the text encoder C1 and output information of the situation information encoder C2 are summed and input to a speech synthesis decoder C3 such that interpretation results for the user surrounding speech are classified according to a plurality of speakers C4 and synthesized as a second speech signal C5 in which pieces of location information of the plurality of speakers are reflected and provided to the automatic interpretation service providing terminal 200 through the user terminal 100.

In addition, an embodiment of the present invention may, based on first and second speech signals and situation information extracted through a user surrounding speech, automatically update performances of a speaker-specific source separation model, a speech recognition model for recognizing a first speech signal, a machine translation model for translating a first speech signal, and an automatic interpretation model having a combination thereof. That is, the embodiment of the present invention may set the first and second speech signals and the situation information as input data and set pieces of information previously output from the respective models as output data and, based on an artificial intelligence model learning method, such as a neural network model, a deep learning model, and the like, automatically update the performances of the respective models. With such a configuration, the embodiment of the present invention may provide a further improved automatic interpretation result to the user as the automatic interpretation service is continuously used.

Figure 11:
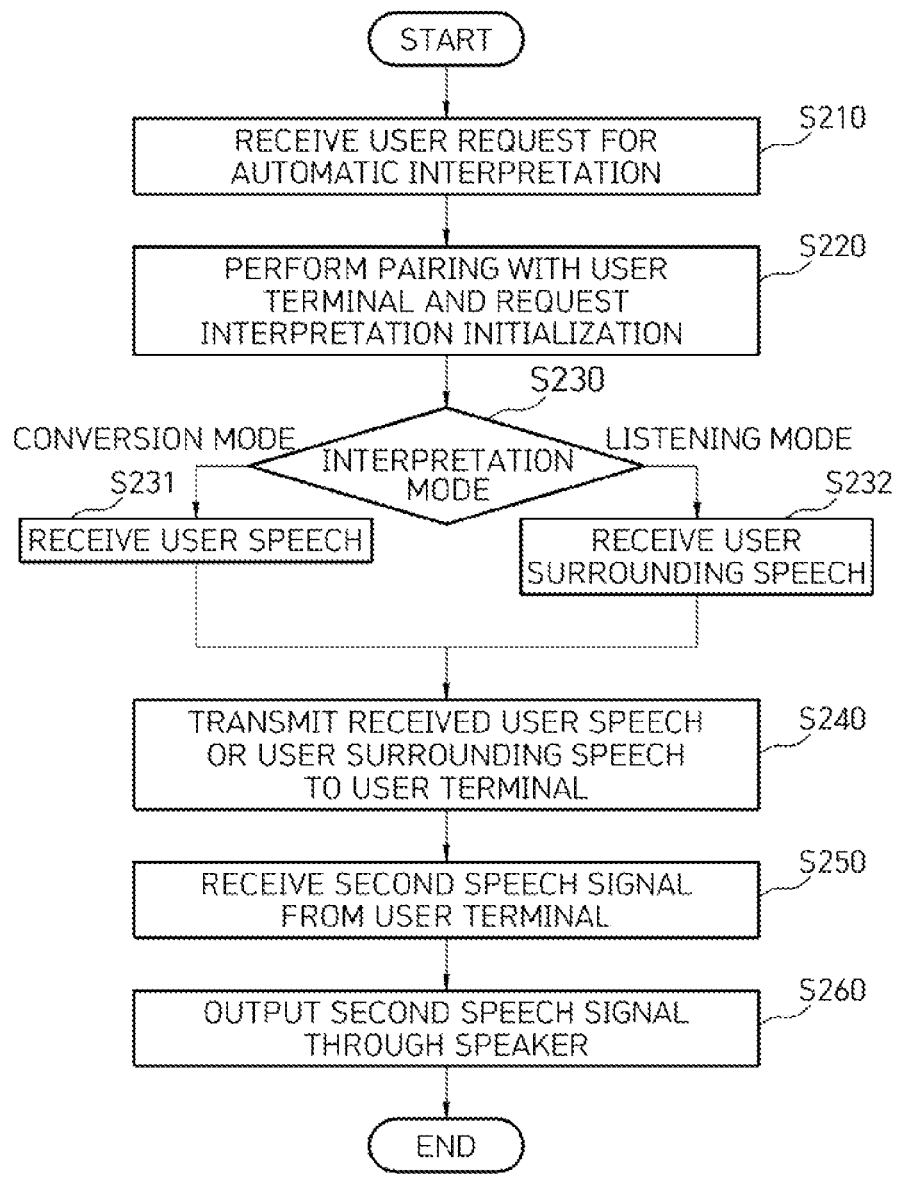
FIG. 11 is a diagram for describing each process performed in an automatic interpretation service providing terminal.

FIG. 11 is a diagram for describing each process performed in the automatic interpretation service providing terminal 200.

The automatic interpretation service providing terminal 200, upon receiving a request for an automatic interpretation from a user (S210), is pairing with the user terminal 100 to thereby request interpretation initialization to the user terminal 100 (S220).

Next, the automatic interpretation service providing terminal 200 identifies the interpretation mode (S230) and, in response to a conversation mode (S231), receives a user speech through the multi-channel microphone 210 (S231) and, in a listening mode, receives a user surrounding speech through the multi-channel microphone 210 (S232).

Next, the automatic interpretation service providing terminal 200 transmits the received user speech or user surrounding speech to the user terminal 100 (S240) and, upon receiving a second speech signal according to an interpretation result from the user terminal 100 or a second speech signal according to an interpretation result of the counterpart terminal 300 through the user terminal 100 (S250), outputs the second speech signal to the user through the speaker 230 (S260).

Meanwhile, in the above description, operations S101 to S260 may be further divided into a larger number of operations or combined into a smaller number of operations according to examples of implementation of the present invention. In addition, some of the operations may be omitted or may be executed in the reverse order as needed. Parts omitted in the following description, which have been described above with reference to FIGS. 1 and 2, may be applied to the method of providing an automatic interpretation based on speaker separation shown in FIGS. 3 to 11.

The embodiment of the present invention described above may be implemented as a program (or an application) to be executed in combination with a server, which is hardware, and stored in a medium.

The program may include codes coded in a computer language, such as C, C++, Java, other machine language, etc., that can be read by a processor (a central processing unit (CPU)) of a computer through a device interface of the computer in order for the computer to read the program and execute the methods implemented as the program. The code may include a functional code that is related to a function that defines functions needed to execute the methods and may include an execution procedure related control code needed to cause the processor of the computer to execute the functions according to a predetermined procedure. In addition, the code may further include a memory reference related code as to whether additional information or media needed to cause the processor of the computer to execute the functions should be referred to at a location (an address) of an internal or external memory of the computer. In addition, when the processor of the computer needs to communicate with any other computers or servers, etc. at a remote site, to perform the above-described functions, the code may further include communication related codes such as how to communicate with any other computers or servers at a remote site and what information or media should be transmitted or received during communication.

The storage medium does not refer to a medium that stores data for a short period of time, such as a register, cache, memory, etc., but refers to a medium that stores data semi-permanently and can be read by a device. Specifically, examples of the storage medium include may include a ROM, a random-access memory (RAM), a CD-ROM, a magnetic tape, a floppy disk, an optical data storage device, etc. but are not limited thereto. That is, the program may be stored in various recording media on various servers which the computer can access or on various recording media on the computer of the user. In addition, the medium may be distributed over computer systems connected through a network so that computer-readable codes may be stored in a distributed manner.

As is apparent from the above, compared to the conventional face-to-face automatic interpretation method, the system, the user terminal, and the method for providing an automatic interpretation service based on speaker separation according to the embodiment of the present invention can allow a user to conveniently acquire information by converting all speeches of a plurality of surrounding speakers around the user into a native language.

In addition, the system, the user terminal, and the method for providing an automatic interpretation service based on speaker separation according to the embodiment of the present invention is combined with the conventional faceto-face method so that an automatic interpretation method providing both a conversation mode and a listening mode can be provided.

In addition, the system, the user terminal, and the method for providing an automatic interpretation service based on speaker separation according to the embodiment of the present invention can be used as an auxiliary tool for language learning and can be applied to foreign language conversation learning for a user to interpret native language speeches around the user into a desired language and hear the interpreted speech.

The effects of the present invention are not limited to those described above, and other effects not mentioned above will be clearly understood by those skilled in the art from the above detailed description.

The above description of the invention is for illustrative purposes, and a person having ordinary skills in the art should appreciate that other specific modifications can be easily made without departing from the technical spirit or essential features of the invention. Therefore, the above-described embodiments should be regarded as illustrative rather than limitative in all aspects. For example, components which have been described as being a single unit can be embodied in a distributed form, whereas components which have been described as being distributed can be embodied in a combined form.

The scope of the present invention is not defined by the detailed description as set forth above but by the accompanying claims of the invention. It should also be understood that all changes or modifications derived from the definitions and scope of the claims and their equivalents fall within the scope of the invention.

What is claimed is:

1. A method of performing automatic interpretation based on speaker separation by a user terminal, the method comprising:
   receiving a first speech signal including at least one of a user speech of a user and a user surrounding speech around the user from an automatic interpretation service providing terminal;
   separating the first speech signal into speaker-specific speech signals;
   performing interpretation on the speaker-specific speech signals in a language selected by the user on the basis of an interpretation mode; and
   providing a second speech signal generated as a result of the interpretation to at least one of a counterpart terminal and the automatic interpretation service providing terminal according to the interpretation mode,
   wherein the performing of interpretation on the speaker-specific speech signals in the language selected by the user on the basis of the interpretation mode includes:
   extracting situation information from the user surrounding speech;
   wherein the providing of the second speech signal generated as the result of the interpretation to the at least one of the counterpart terminal and the automatic interpretation service providing terminal according to the interpretation mode includes:
   classifying speech signals according to each speaker from the extracted situation information; and
   providing the automatic interpretation service providing terminal with an interpretation result in which intensity information and echo information of the speech signals classified according to each speaker are reflected.

2. The method of claim 1, wherein the receiving of the first speech signal including the at least one of the user speech of the user and the user surrounding speech includes receiving the first speech signal on the basis of the interpretation mode from the automatic interpretation service providing terminal,
   wherein the automatic interpretation service providing terminal receives the user speech through a microphone when the interpretation mode is a conversation mode and receives the user surrounding speech through the microphone when the interpretation mode is a listening mode.

3. The method of claim 1, wherein the performing of interpretation on the speaker-specific speech signals in the language selected by the user on the basis of the interpretation mode includes, when the interpretation mode is a conversation mode, selecting the user speech among the separated speaker-specific speech signals to perform the interpretation, and
   the providing of the second speech signal generated as the result of the interpretation to the at least one of the counterpart terminal and the automatic interpretation service providing terminal according to the interpretation mode includes providing the counterpart terminal with the second speech signal, which is an interpretation result for the user speech, and providing the automatic interpretation service providing terminal with an interpretation result for a counterpart speech received from the counterpart terminal.

4. The method of claim 1, wherein the performing of interpretation on the speaker-specific speech signals in the language selected by the user on the basis of the interpretation mode includes, when the interpretation mode is a listening mode, selecting the user surrounding speech among the separated speaker-specific speech signals to perform the interpretation, and
   the providing of the second speech signal generated as the result of the interpretation to the at least one of the counterpart terminal and the automatic interpretation service providing terminal according to the interpretation mode includes classifying interpretation results for the user surrounding speech according to each speaker and providing the automatic interpretation service providing terminal with the interpretation results.

5. The method of claim 4, wherein the performing of interpretation on the speaker-specific speech signals into the language selected by the user on the basis of the interpretation mode includes:
   extracting the situation information including at least one of speaker information, context information, and noise information from the user surrounding speech;
   storing the extracted situation information in a buffer; and
   interpreting the speaker-specific speech signal included in the user surrounding speech on the basis of the extracted situation information.

6. The method of claim 4, wherein the providing of the second speech signal generated as the result of the interpretation to the at least one of the counterpart terminal and the automatic interpretation service providing terminal according to the interpretation mode includes providing the automatic interpretation service providing terminal with an interpretation result corresponding to at least one speaker selected by the user among the interpretation results for the user surrounding speech.

7. A user terminal for providing an automatic interpretation service based on speaker separation, the user terminal comprising:

a communication module configured to transmit and receive data to and from an automatic interpretation service providing terminal and a counterpart terminal;

a memory in which a program for receiving a first speech signal including at least one of a user speech of a user and a user surrounding speech around the user from the automatic interpretation service providing terminal and, based on the received first speech signal, generating a second speech signal that is an interpretation result is stored; and a processor configured to execute the program stored in the memory, wherein the processor executes the program to:

separate the first speech signal into speaker-specific speech signals;

perform interpretation on the speaker-specific speech signals in a language selected by the user on the basis of an interpretation mode; and provide a second speech signal generated as a result of the interpretation to at least one of a counterpart terminal and the automatic interpretation service providing terminal through the communication module according to the interpretation mode, wherein the processor, when the interpretation mode is a listening mode, selects the user surrounding speech among the separated speaker-specific speech signals to perform the interpretation, classifies interpretation results for the user surrounding speech according to each speaker, and provides the automatic interpretation service providing terminal with the interpretation results through the communication module, wherein the processor extracts situation information including at least one of speaker information, context information, and noise information from the user surrounding speech, stores the extracted situation information in a buffer, and interprets the speaker-specific speech signal included in the user surrounding speech on the basis of the extracted situation information, and wherein the processor is configured to, based on the first and second speech signals and the extracted situation information, automatically update performances of a speaker-specific source separation model for separating the first speech signal into the speaker-specific speech signals, a speech recognition model for recognizing the first speech signal, a machine translation model for translating the first speech signal, and an automatic interpretation model having a combination thereof.

8. The user terminal of claim 7, wherein the automatic interpretation service providing terminal receives the user speech through a microphone when the interpretation mode is a conversation mode and receives the user surrounding speech through the microphone when the interpretation mode is a listening mode.

9. The user terminal of claim 7, wherein the processor, when the interpretation mode is a conversation mode, selects the user speech among the separated speaker-specific speech signals to perform the interpretation, provides the counterpart terminal with the second speech signal, which is an interpretation result for the user speech, through the communication module, and provides the automatic interpretation service providing terminal with an interpretation result for a counterpart speech received from the counterpart terminal.

10. The user terminal of claim 7, wherein the processor classifies speech signals according to each speaker from the extracted situation information and provides the automatic interpretation service providing terminal with an interpretation result, in which intensity information and echo information of the speech signal classified according to each speaker are reflected, through the communication module.

11. The user terminal of claim 7, wherein the processor provides the automatic interpretation service providing terminal with an interpretation result corresponding to at least one speaker selected by the user among the interpretation results for the user surrounding speech.

12. A system for providing an automatic interpretation service based on speaker separation, the system comprising:

an automatic interpretation service providing terminal configured to receive a first speech signal including at least one of a user speech of a user and a user surrounding speech around the user through a multi-channel microphone and provide an interpretation result for the speech signal and an interpretation result for a counterpart speech through a speaker;

a user terminal configured to receive the first speech signal, separate the received first speech signal into speaker-specific signals, perform interpretation on the speaker-specific speech signals in a language selected by the user on the basis of an interpretation mode, and provide a second speech signal generated as a result of the interpretation to at least one of a counterpart terminal and the automatic interpretation service providing terminal according to the interpretation mode; and the counterpart terminal configured to receive the second speech signal from the user terminal and provide the received second speech signal, interpret the counterpart speech and provide the interpreted counterpart speech according to the interpretation mode, wherein the user terminal is configured to extract situation information from the user surrounding speech, provide of the second speech signal generated as the result of the interpretation to the at least one of the counterpart terminal and the automatic interpretation service providing terminal according to the interpretation mode, classify speech signals according to each speaker from the extracted situation information, and provide the automatic interpretation service providing terminal with an interpretation result in which intensity information and echo information of the speech signals classified according to each speaker are reflected.

* * * * *